Patented Apr. 2, 1940

2,196,156

UNITED STATES PATENT OFFICE 2,196,156

PRODUCTION OF FORMIC ACID

Walter Speer and Hans Weiss, Ludwigshafen-on-the-Rhine, Germany, assignors to I. G. Farbenindustrie Aktiengesellschaft, Frankfort-on-the-Main, Germany No Drawing. Application March 23, 1937, Serial No. 132,488. In Germany March 25, 1936

3 Claims. (Cl. 260—542)

The present invention relates to a process of producing formic acid.

It has already been suggested to produce formic acid by causing concentrated mineral acid, more particularly sulphuric acid, and water to react with formamide. The reaction proceeds according to the following equation:

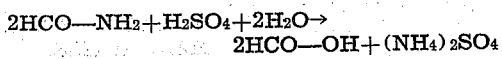
$$2HCO-NH_2 + H_2SO_4 + 2H_2O \rightarrow 2HCO-OH + (NH_4)_2SO_4$$

In order to avoid in this reaction a decomposition of the resulting formic acid by the action of the sulphuric acid present, any heat evolved during the mixing of the reaction components was eliminated by a strong external cooling. Only after the reaction of the said mixture was in part complete, was it heated for some time at from about 60° to 80° C. and the formic acid formed then separated from the ammonium salt by distillation.

We have now found that formic acid can be obtained in good yields and in an advantageous manner by causing formamide to react with water and mineral acid and by carrying out the reaction at a temperature exceeding 85° C., especially at temperatures between about 100° and 125° C., and preferably in the presence of formic acid. Within the said range of temperature the reaction proceeds so rapidly that, notwithstanding the comparatively high reaction temperature, any decomposition of the formic acid by means of the free sulphuric acid present is practically prevented.

The method of working according to our invention is especially valuable for the manufacture of formic acid in a continuous process. Preferably the reaction components are allowed to run continuously in substantially equivalent proportions into formic acid which is heated to reaction temperature while distilling off formic acid substantially as fast as it is formed. The formic acid distilled off is thus continuously replenished by the acid formed in the reaction so that the amount of formic acid left in the reaction vessel remains substantially constant. The formic acid distilled off is obtained in a pure state having a strength of 98 per cent, or even more.

The instant process is superior to the methods of operating hitherto in use also from a heat-economical point of view since the heat evolved by the reaction need not be eliminated by external cooling, but may be rendered useful for distilling off the formic acid formed. Thus the process of producing formic acid according to our invention may be completely carried through without any further supply of heat.

In order to ensure a continuous operation in the manufacture of formic acid it is necessary to remove from time to time the ammonium salt of the mineral acid employed which collects and is precipitated in the formic acid within the reaction vessel. The separation of the ammonium salt from the mother liquor may be easily performed by centrifuging or filtration. The mother liquor may then be returned to the reaction vessel, advantageously in a closed apparatus operating on the cyclic course principle. Generally speaking a practically complete separation of the ammonium salt from the formic acid is only possible when working at temperatures above 60° C.; below the said temperature it is impossible to separate the ammonium salt with a content of formic acid of less than 20%. On the other hand the ammonium salt separated at temperatures exceeding 60° C. generally speaking contains only up to 0.5% of formic acid. These traces of formic acid may easily be removed from the ammonium salt by blowing it out by means of heated air or other inert gases or vapors and reclaimed for example by washing these gases or vapors with formamide which may be used as starting material for the production of formic acid. When performing the reaction with sulphuric acid ammonium sulphate is obtained in a granular form in which it may be rendered useful as fertilizer.

The following example may further illustrate how the said invention may be carried out in practice, but the invention is not restricted to the example.

Example

A well insulated distillation vessel fitted with a stirrer and with its lower end tapered to a point is half filled with formic acid and heated. When the formic acid begins to distill off, a mixture of 1 molecular proportion of formamide, 1 molecular proportion of water and half a molecular proportion of 100 per cent sulphuric acid is run in for each molecular proportion of formic acid distilled off. The temperature of the reaction liquid is allowed gradually to rise from the boiling point of formic acid up to about 125° C. in the ratio as the contents of formic acid or ammonium salt increases, provided there is worked at atmospheric pressure and with a sufficient speed of distillation. This speed preferably is so adjusted that the reaction according to the present process, when carried out in a vessel having a capacity of 100 litres, yields about 100 litres of formic acid within from 4 to 8 hours. When working under reduced pressure provision should be made that the temperature within the reaction vessel does not fall substantially below 85° C., the speed of reaction being, below the said temperature, too low, in which case on the one hand aqueous formic acid would be obtained in the distillate and on the other hand the ammonium sulphate remaining in the reaction vessel would contain sulphuric acid. When working at superatmospheric pressure the temperature of distillation rises in conformity with the increase in pressure.

As soon as a sufficient amount of ammonium sulphate has separated out in the reaction vessel which may either be ascertained through an observation glass or easily calculated from the amount of formic acid distilled off, about one third of the contents of the vessel is centrifuged from time to time in a heated centrifuge which is preferably arranged beneath the reaction vessel. The mother liquor may directly be returned to the reaction vessel.

The formic acid thus obtained in a yield of 95 to 96 per cent of the theory has a strength of 98 per cent.

What we claim is:

1. In the production of formic acid from formamide the step which comprises introducing substantially equivalent proportions of formamide, sulphuric acid and water into formic acid heated to temperatures between about 100° and 125° C. and distilling off formic acid substantially as fast as it is formed.

2. In the production of formic acid from formamide the step which comprises introducing continuously a mixture of substantially equivalent proportions of formamide, sulphuric acid and water into formic acid heated to temperatures between about 100° and 125° C., distilling off continuously formic acid substantially as fast as it is formed and removing from time to time the ammonium sulphate formed from the reaction mixture at temperatures exceeding 60° C.

3. In the production of formic acid from formamide the step which comprises introducing continuously a mixture of substantially equivalent proportions of formamide, sulphuric acid and water into formic acid heated to temperatures between about 100° and 125° C., distilling off continuously formic acid substantially as fast as it is formed, removing from time to time the ammonium sulphate formed from the reaction mixture at temperatures exceeding 60° C., blowing out the traces of formic acid contained therein by means of heated inert gases, and reclaiming the formic acid from the gases by washing them with formamide.

WALTER SPEER.
HANS WEISS.